(12) United States Patent
Matsuyama

(10) Patent No.: US 10,934,842 B2
(45) Date of Patent: Mar. 2, 2021

(54) TURBOCHARGER AND METHOD FOR ASSEMBLING TURBOCHARGER

(71) Applicant: IHI Corporation, Koto-ku (JP)

(72) Inventor: Yoshimitsu Matsuyama, Tokyo (JP)

(73) Assignee: IHI Corporation, Koto-ku (JP)

( * ) Notice: Subject to any disclaimer, the term of this patent is extended or adjusted under 35 U.S.C. 154(b) by 59 days.

(21) Appl. No.: 16/254,862

(22) Filed: Jan. 23, 2019

(65) Prior Publication Data

US 2019/0153868 A1    May 23, 2019

Related U.S. Application Data

(63) Continuation of application No. PCT/JP2017/033062, filed on Sep. 13, 2017.

(30) Foreign Application Priority Data

Sep. 15, 2016 (JP) .............................. JP2016-180388

(51) Int. Cl.
| | |
|---|---|
| *F01D 5/04* | (2006.01) |
| *F04D 29/60* | (2006.01) |
| *F01D 5/02* | (2006.01) |
| *F04D 29/26* | (2006.01) |
| *F02B 39/00* | (2006.01) |

(52) U.S. Cl.
CPC .......... *F01D 5/025* (2013.01); *F04D 29/266* (2013.01); *F02B 39/00* (2013.01); *F05D 2220/40* (2013.01); *F05D 2230/60* (2013.01); *F05D 2260/37* (2013.01)

(58) Field of Classification Search
CPC .... F01D 5/025; F04D 29/266; F05D 2230/60; F05D 2260/37; F16B 11/002; F16B 17/006; F16B 19/05; F16B 37/065
See application file for complete search history.

(56) References Cited

U.S. PATENT DOCUMENTS

| | | | | | |
|---|---|---|---|---|---|
| 3,559,946 | A | * | 2/1971 | Baxter, Jr. ............ | B21K 25/00 251/129.16 |
| 4,413,717 | A | * | 11/1983 | Kanamaru ............ | B21K 25/00 192/107 M |
| 4,749,334 | A | | 6/1988 | Byrne | |
| 4,944,660 | A | | 7/1990 | Joco | |
| 5,090,101 | A | | 2/1992 | Welty | |

(Continued)

FOREIGN PATENT DOCUMENTS

| | | |
|---|---|---|
| CN | 1626864 A | 6/2005 |
| CN | 101529063 A | 9/2009 |

(Continued)

OTHER PUBLICATIONS

International Search Report dated Nov. 7, 2017 in PCT/JP2017/033062, filed on Sep. 13, 2017 (with English Translation).

(Continued)

*Primary Examiner* — Ninh H. Nguyen
(74) *Attorney, Agent, or Firm* — Oblon, McClelland, Maier & Neustadt, L.L.P.

(57) ABSTRACT

Provided is a turbocharger, including: a compressor impeller (impeller) having a through hole; a shaft inserted through the through hole; and a fastening member caulked to a distal end portion of the shaft projecting from the through hole.

3 Claims, 6 Drawing Sheets

(56) References Cited

U.S. PATENT DOCUMENTS

| | | | |
|---|---|---|---|
| 5,121,537 A * | 6/1992 | Matsui | B21D 39/03 |
| | | | 29/514 |
| 6,364,634 B1 * | 4/2002 | Svihla | F01D 5/025 |
| | | | 417/409 |
| 2005/0028523 A1 | 2/2005 | Nishiyama et al. | |
| 2011/0064581 A1 | 3/2011 | Bassler et al. | |
| 2015/0167695 A1 | 6/2015 | Saito | |
| 2016/0273545 A1 | 9/2016 | Hayashi et al. | |

FOREIGN PATENT DOCUMENTS

| | | | |
|---|---|---|---|
| CN | 101725563 A | | 6/2010 |
| CN | 201934153 U | | 8/2011 |
| CN | 103314197 A | | 9/2013 |
| CN | 105934569 A | | 9/2016 |
| EP | 2 876 276 A1 | | 5/2015 |
| JP | 59-79501 U | | 5/1984 |
| JP | 60-63095 | | 5/1985 |
| JP | 63-57904 | | 3/1988 |
| JP | 63-83494 U | | 6/1988 |
| JP | 63-183434 U | | 11/1988 |
| JP | 4-283078 A | | 10/1992 |
| JP | 5-504804 | | 7/1993 |
| JP | 2005-16313 | | 1/2005 |
| JP | 4242212 | | 3/2009 |
| JP | 2011-514947 | | 5/2011 |
| JP | 2013-142359 A | | 7/2013 |
| JP | 2014-20255 | | 2/2014 |
| JP | WO2015/087414 | | 6/2015 |
| JP | 2017-72058 | | 4/2017 |
| WO | WO 2014/013952 A1 | | 1/2014 |

OTHER PUBLICATIONS

Written Opinion dated Nov. 7, 2017 in PCT/JP2017/033062, filed on Sep. 13, 2017.

Combined Chinese Office Action and Search Report dated Jun. 2, 2020, in Patent Application No. 201780044488.X (with English translation), 15 pages.

Japanese Office Action issued in Japanese Patent Application No. 2020-049320 dated Jan. 19, 2021.

* cited by examiner

FIG.5
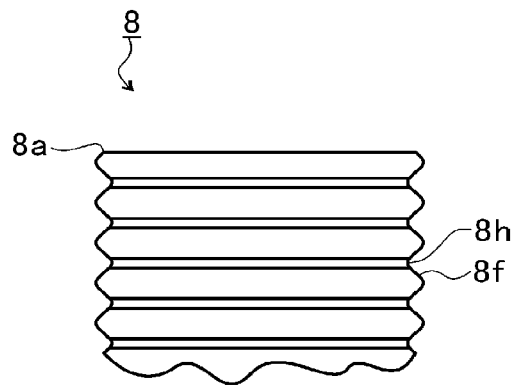
FIG.6A  FIG.6B  FIG.6C
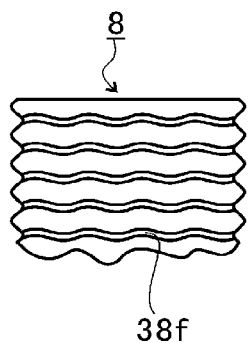 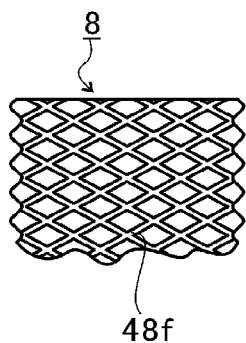 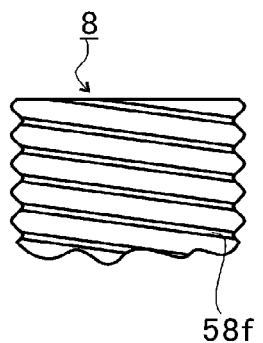
FIG.7A  FIG.7B
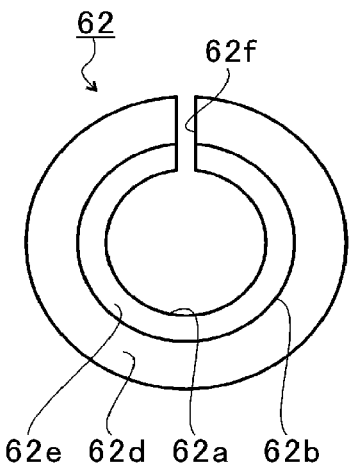 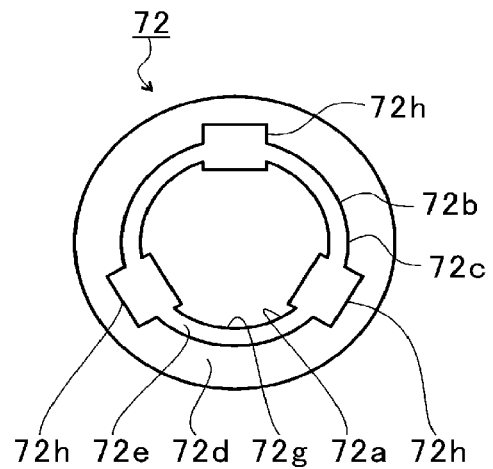

TURBOCHARGER AND METHOD FOR ASSEMBLING TURBOCHARGER

CROSS REFERENCE TO RELATED APPLICATIONS

This application is a continuation application of International Application No. PCT/JP2017/033062, filed on Sep. 13, 2017, which claims priority to Japanese Patent Application No. 2016-180388, filed on Sep. 15, 2016, the entire contents of which are incorporated by reference herein.

BACKGROUND ART

Technical Field

The present disclosure relates to a turbocharger including an impeller provided to a shaft, and a method for assembling a turbocharger.

Related Art

Hitherto, there has been known a turbocharger in which a shaft is axially supported so as to be rotatable in a bearing housing. A turbine impeller is provided at one end of the shaft. A compressor impeller is provided at another end of the shaft. Such a turbocharger is connected to an engine. The turbine impeller is rotated by exhaust gas discharged from the engine. The rotation of the turbine impeller causes the compressor impeller to rotate through the shaft. In such a manner, the turbocharger compresses air along with the rotation of the compressor impeller and delivers the compressed air to the engine.

For example, as described in Patent Literature 1, the shaft includes a large-diameter portion, a small-diameter portion, and a stepped surface. The large-diameter portion is axially supported by a bearing. The small-diameter portion is positioned on one end side of the shaft with respect to the large-diameter portion. The stepped surface extends from the large-diameter portion to the small-diameter portion in a radial direction. The small-diameter portion of the shaft is inserted through a thrust bearing, a collar, or other members. The small-diameter portion of the shaft is inserted through the compressor impeller. A distal end portion of the shaft projects from the compressor impeller. A nut is threadedly engaged with thread grooves of the distal end portion. Axial tension is generated between the stepped surface and the nut. The compressor impeller is fastened to the shaft.

CITATION LIST

Patent Literature

Patent Literature 1: Japanese Patent No. 4242212

SUMMARY

Technical Problem

Incidentally, for example, as in the case of the compressor impeller described in Patent Literature 1, the impeller and the shaft are fastened to each other. In this case, even when nut fastening torque is set within a predetermined range, the axial tension to be generated is influenced by fluctuation in friction between the nut and the impeller. Accordingly, it has been difficult to control the axial tension.

It is an object of the present disclosure to provide a turbocharger and a method for assembling a turbocharger, which are capable of easily controlling axial tension of fastening an impeller as compared to the related art.

Solution to Problem

In order to achieve the above-mentioned object, according to one embodiment of the present disclosure, there is provided a turbocharger, including: an impeller having a through hole; a shaft inserted through the through hole; and a fastening member caulked to a distal end portion of the shaft projecting from the through hole.

The fastening member includes a main body having an insertion hole through which the distal end portion of the shaft is to be inserted, and groove portions may be formed in an outer peripheral surface of the distal end portion of the shaft, and an inner peripheral surface of the insertion hole of the fastening member may enter the groove portions.

The groove portions may extend in parallel to a circumferential direction of the shaft.

A flange portion may be formed on an outer surface of the main body of the fastening member on the impeller side to project from the outer surface in a radial direction.

In order to achieve the above-mentioned object, according to one embodiment of the present disclosure, there is provided a method for assembling a turbocharger including an impeller having a through hole, and a shaft, the method including: a step of inserting the shaft through the through hole; and a step of caulking a fastening member to a distal end portion of the shaft projecting from the through hole.

The step of caulking the fastening member may include: a step of inserting the distal end portion of the shaft projecting from the through hole of the impeller through an insertion hole formed in a main body of the fastening member; a step of applying a load of pulling the shaft; and a step of caulking the fastening member to the shaft by moving a jig, which applies a pressing force from an outer surface of the fastening member to a shaft center side of the shaft, in an axial direction of the shaft so as to press the fastening member.

In the step of caulking the fastening member to the shaft by moving the jig in the axial direction of the shaft so as to press the fastening member, the jig may be moved along the axial direction of the shaft in a direction of separating from the impeller.

Effects of Disclosure

According to the present disclosure, axial tension of fastening an impeller can be easily controlled as compared to the related art.

BRIEF DESCRIPTION OF DRAWINGS

FIG. 5 is an enlarged view of groove portions of the shaft.
FIG. 6A is an explanatory view for illustrating a first modification example.

FIG. 6B is an explanatory view for illustrating a second modification example.

FIG. 6C is an explanatory view for illustrating a third modification example.

FIG. 7A is an explanatory view for illustrating a fourth modification example.

FIG. 7B is an explanatory view for illustrating a fifth modification example.

DESCRIPTION OF EMBODIMENT

Figure 1:
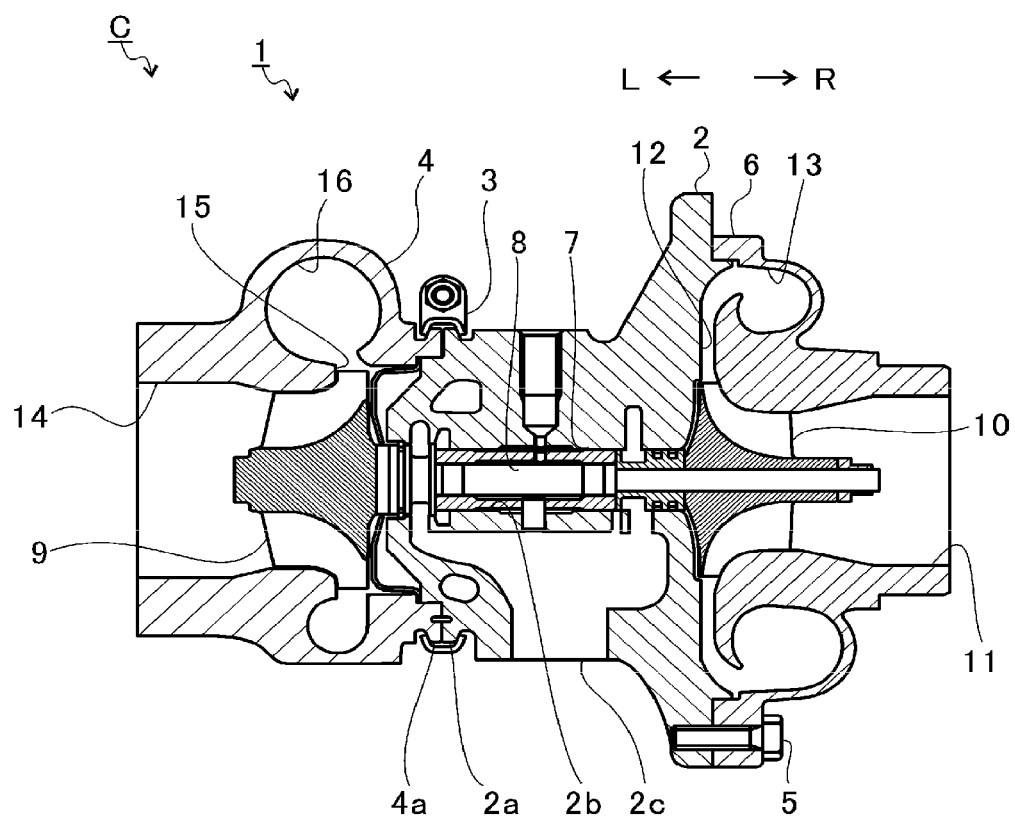
FIG. 1 is a schematic sectional view of a turbocharger.

Now, with reference to the attached drawings, one embodiment of the present disclosure is described in detail. The dimensions, materials, and other specific numerical values represented in the embodiment are merely examples used for facilitating the understanding of the disclosure, and do not limit the present disclosure unless otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of a turbocharger C. In the following description, the direction indicated by the arrow L illustrated in FIG. 1 corresponds to a left side of the turbocharger C. The direction indicated by the arrow R illustrated in FIG. 1 corresponds to a right side of the turbocharger C. As illustrated in FIG. 1, the turbocharger C includes a turbocharger main body 1. The turbocharger main body 1 includes a bearing housing 2. A turbine housing 4 is coupled to the bearing housing 2 on the left side by a fastening mechanism 3. A compressor housing 6 is coupled to the bearing housing 2 on the right side by a fastening bolt 5. The bearing housing 2, the turbine housing 4, and the compressor housing 6 are integrated with each other.

A projection 2a is formed on an outer peripheral surface of the bearing housing 2 in a vicinity of the turbine housing 4. The projection 2a projects in a radial direction of the bearing housing 2. A projection 4a is formed on an outer peripheral surface of the turbine housing 4 in a vicinity of the bearing housing 2. The projection 4a projects in a radial direction of the turbine housing 4. The projections 2a and 4a are band-fastened by the fastening mechanism 3. Thus, the bearing housing 2 and the turbine housing 4 are fastened to each other. The fastening mechanism 3 is formed of, for example, a G coupling configured to nip the projections 2a and 4a.

The bearing housing 2 has a bearing hole 2b. The bearing hole 2b penetrates through the bearing housing 2 in a right-and-left direction of the turbocharger C. A shaft 8 is axially supported by a bearing 7 (in this embodiment, a semi-floating bearing is illustrated in FIG. 1 as an example), which is provided in the bearing hole 2b, so as to be rotatable. A turbine impeller 9 is fastened to a left end portion of the shaft 8. The turbine impeller 9 is received in the turbine housing 4 so as to be rotatable. Moreover, a compressor impeller 10 (impeller) is fastened to a right end portion of the shaft 8. The compressor impeller 10 is received in the compressor housing 6 so as to be rotatable.

The compressor housing 6 has a suction port 11. The suction port 11 is opened on the right side of the turbocharger C. The suction port 11 is connected to an air cleaner (not shown). Moreover, under a state in which the bearing housing 2 and the compressor housing 6 are coupled to each other by the fastening bolt 5, a diffuser flow passage 12 is formed. The diffuser flow passage 12 is formed by opposed surfaces of the bearing housing 2 and the compressor housing 6. The diffuser flow passage 12 increases pressure of air. The diffuser flow passage 12 is annularly formed so as to extend from an inner side toward an outer side in a radial direction of the shaft 8. The diffuser flow passage 12 communicates with the suction port 11 through intermediation of the compressor impeller 10 on the inner side in the radial direction.

Further, the compressor housing 6 has a compressor scroll flow passage 13. The compressor scroll flow passage 13 has an annular shape. The compressor scroll flow passage 13 is located on the radially outer side of the shaft 8 with respect to the diffuser flow passage 12. The compressor scroll flow passage 13 communicates with a suction port of an engine (not shown). The compressor scroll flow passage 13 communicates also with the diffuser flow passage 12. Thus, when the compressor impeller 10 is rotated, air is sucked into the compressor housing 6 through the suction port 11. The sucked air is pressurized and accelerated by an action of the centrifugal force during a course of flowing through blades of the compressor impeller 10. The air having been pressurized and accelerated is increased in pressure in the diffuser flow passage 12 and the compressor scroll flow passage 13, and is introduced to the suction port of the engine.

The turbine housing 4 has a discharge port 14. The discharge port 14 is opened on the left side of the turbocharger C. The discharge port 14 is connected to an exhaust gas purification device (not shown). Moreover, a flow passage 15 and a turbine scroll flow passage 16 are formed in the turbine housing 4. The turbine scroll flow passage 16 has an annular shape. The turbine scroll flow passage 16 is located on an outer side in a radial direction of the turbine impeller 9 with respect to the flow passage 15. The turbine scroll flow passage 16 communicates with a gas inflow port (not shown). Exhaust gas discharged from an exhaust gas manifold (not shown) of the engine is introduced to the gas inflow port. The turbine scroll flow passage 16 communicates also with the flow passage 15. Thus, the exhaust gas introduced through the gas inflow port to the turbine scroll flow passage 16 is introduced to the discharge port 14 through the flow passage 15 and the turbine impeller 9. The exhaust gas causes the turbine impeller 9 to rotate during a course of flowing.

Then, a rotational force of the turbine impeller 9 is transmitted to the compressor impeller 10 through the shaft 8. The air is increased in pressure in the manner described above due to the rotational force of the compressor impeller 10, and is introduced to the suction port of the engine.

Figure 2:
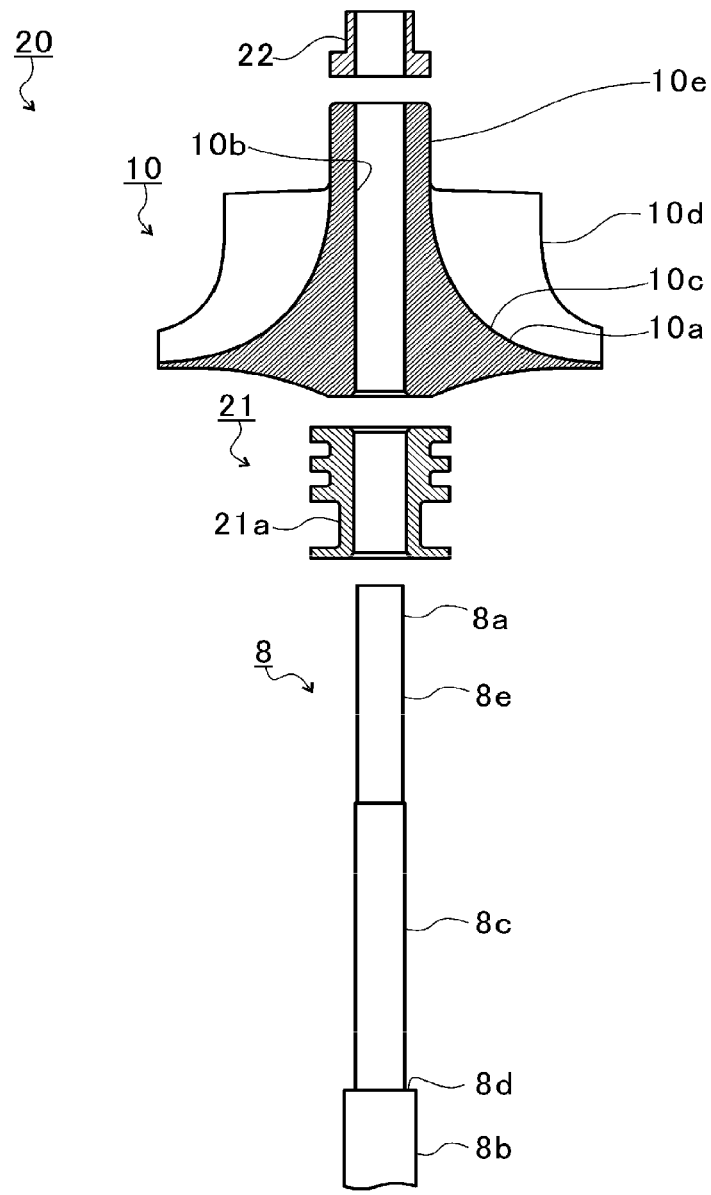
FIG. 2 is a first view for illustrating a fastening structure for fastening a compressor impeller to a shaft.
Figure 3:
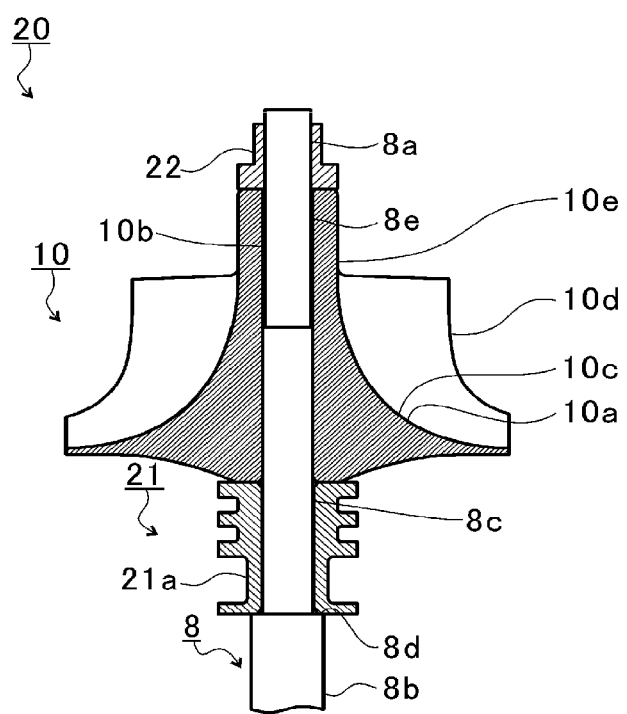
FIG. 3 is a second view for illustrating the fastening structure for fastening the compressor impeller to the shaft.

FIG. 2 and FIG. 3 are each an explanatory view for illustrating a fastening structure 20 for fastening the compressor impeller 10 to the shaft 8. FIG. 2 is an illustration of a state before the compressor impeller 10 is fastened to the shaft 8. FIG. 3 is an illustration of a state after the compressor impeller 10 is fastened to the shaft 8. As illustrated in FIG. 2 and FIG. 3, the fastening structure 20 includes, in addition to the shaft 8 and the compressor impeller 10, an oil thrower member 21 and a fastening member 22.

The oil thrower member 21 includes a main body portion 21a having a cylindrical shape. A distal end portion 8a of the shaft 8 is inserted through the main body portion 21a. Part of lubricating oil after lubricating the bearing 7 illustrated in FIG. 1 flows along the shaft 8 to the distal end portion 8a side of the shaft 8. The lubricating oil having flowed to the distal end portion 8a side reaches the main body portion 21a of the oil thrower member 21 directly before the compressor impeller 10. The oil thrower member 21 scatters the lubricating oil to a radially outer side by a centrifugal force. The scattered lubricating oil is discharged to an outside through an oil discharge port 2c (see FIG. 1) formed in the bearing housing 2. Thus, the oil thrower member 21 has a function of preventing leakage of lubricating oil to the compressor impeller 10 side.

Further, the compressor impeller 10 is made of metal such as titanium aluminum alloy, which has higher strength than that of a plastic. The compressor impeller 10 includes a main body portion 10a (hub portion). The main body portion 10a has a substantially axially symmetric shape. A through hole 10b is formed in the main body portion 10a. The shaft 8 is inserted through the main body portion 10a. A plurality of fins 10d are formed on an outer peripheral surface 10c of the main body portion 10a. As illustrated in FIG. 3, a boss portion 10e is a portion of the main body portion 10a projecting to the distal end portion 8a side of the shaft 8 with respect to the plurality of fins 10d.

Further, on the compressor impeller 10 side of the shaft 8, for example, a large-diameter portion 8b, an intermediate-diameter portion 8c, a stepped surface 8d, and a small-diameter portion 8e are formed. The intermediate-diameter portion 8c is formed to have an outer diameter smaller than that of the large-diameter portion 8b. The intermediate-diameter portion 8c is formed on the distal end portion 8a side of the shaft 8 with respect to the large-diameter portion 8b. The stepped surface 8d is formed by a difference in outer diameter between the large-diameter portion 8b and the intermediate-diameter portion 8c. The stepped surface 8d connects the large-diameter portion 8b and the intermediate-diameter portion 8c to each other.

The stepped surface 8d extends from the large-diameter portion 8b to the intermediate-diameter portion 8c in a radial direction of the shaft 8. The stepped surface 8d faces the distal end portion 8a side of the shaft 8. An outer diameter of the small-diameter portion 8e is slightly smaller than the outer diameter of the intermediate-diameter portion 8c. The small-diameter portion 8e is formed on the distal end portion 8a side of the shaft 8 with respect to the intermediate-diameter portion 8c. Further, an inner diameter of the main body portion 21a of the oil thrower member 21 is larger than the outer diameter of the intermediate-diameter portion 8c. The inner diameter of the main body portion 21a is smaller than the outer diameter of the large-diameter portion 8b.

Next, description is made of an example of a procedure of fastening the compressor impeller 10 to the shaft 8. First, from the state illustrated in FIG. 2, the shaft 8 is inserted through the main body portion 21a of the oil thrower member 21. A lower end portion of the main body portion 21a, which is illustrated on the lower side in FIG. 2, is brought into abutment against the stepped surface 8d.

Further, the shaft 8 is inserted through the through hole 10b of the main body portion 10a of the compressor impeller 10. An upper end portion of the main body portion 21a of the oil thrower member 21 is brought into abutment against a lower end portion of the main body portion 10a of the compressor impeller 10, which is illustrated on the lower side in FIG. 2.

At this time, the small-diameter portion 8e is opposed to an inner peripheral surface of the through hole 10b at a distance in the radial direction of the shaft 8. That is, a clearance is defined between the small-diameter portion 8e and the inner peripheral surface of the through hole 10b in the radial direction of the shaft 8.

Meanwhile, the through hole 10b and the intermediate-diameter portion 8c are fitted to each other. The through hole 10b and the intermediate-diameter portion 8c have a dimensional relationship which enables, for example, interference fitting or intermediate fitting. Specifically, in a case of interference fitting, the outer diameter of the intermediate-diameter portion 8c is larger than an inner diameter of the through hole 10b. In a case of intermediate fitting, the outer diameter of the intermediate-diameter portion 8c is sometimes larger than the inner diameter of the through hole 10b within an allowable range. In those cases, the intermediate-diameter portion 8c may be fitted to the through hole 10b through warm shrink fitting (shrink fitting), for example, by heating the compressor impeller 10.

Here, description is made of the case in which the intermediate-diameter portion 8c is fitted to the through hole 10b through interference fitting or intermediate fitting. However, without forming the intermediate-diameter portion 8c, an entire region of the shaft 8 to be inserted through the through hole 10b may be formed as the small-diameter portion 8e, and a clearance may be defined in the radial direction between the small-diameter portion 8e and the through hole 10b.

As illustrated in FIG. 3, under a state in which the shaft 8 is inserted through the main body portion 21a and the main body portion 10a, the distal end portion 8a of the shaft 8 projects from the through hole 10b. Groove portions 8f described later (see FIG. 4A, FIG. 4B, and FIG. 4C) are formed in the outer peripheral surface of the distal end portion 8a. The fastening member 22 is caulked to the groove portions 8f so that the oil thrower member 21 and the compressor impeller 10 are fastened to the shaft 8. For example, under a state in which desired axial tension is generated between the stepped surface 8d of the shaft 8 and the fastening member 22 through use of a pressing unit of a tension apparatus described later, the fastening member 22 is caulked to the groove portions 8f.

Figure 4A:
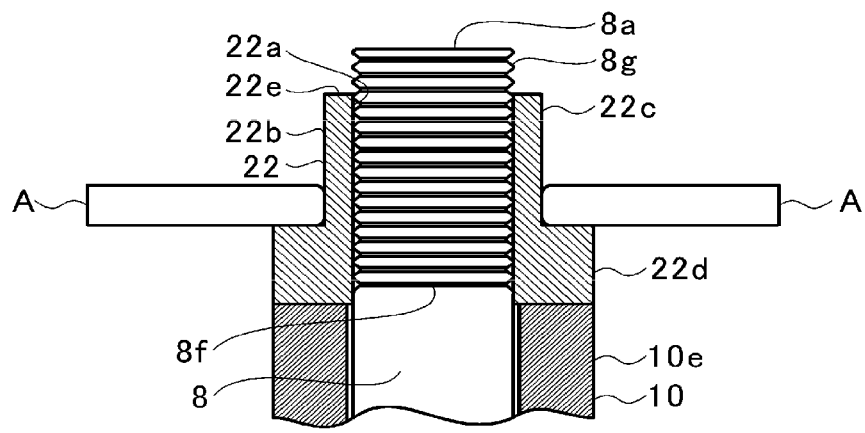
FIG. 4A, FIG. 4B, and FIG. 4C are explanatory views for illustrating an example of a caulking process for a fastening member.
Figure 4B:
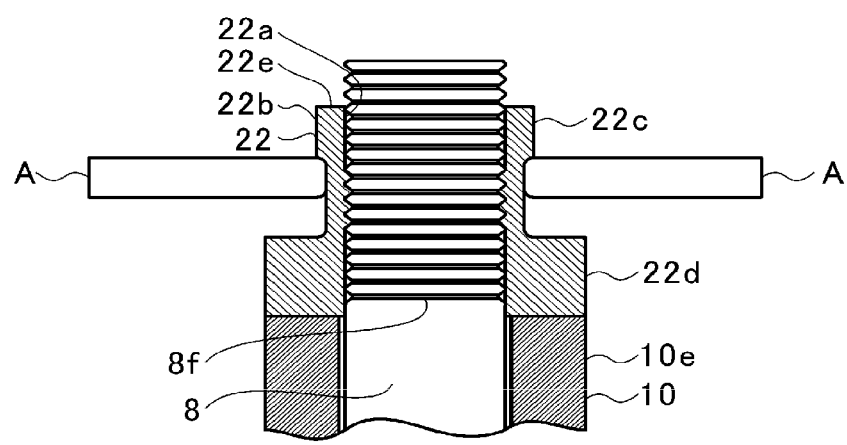
Figure 4C:
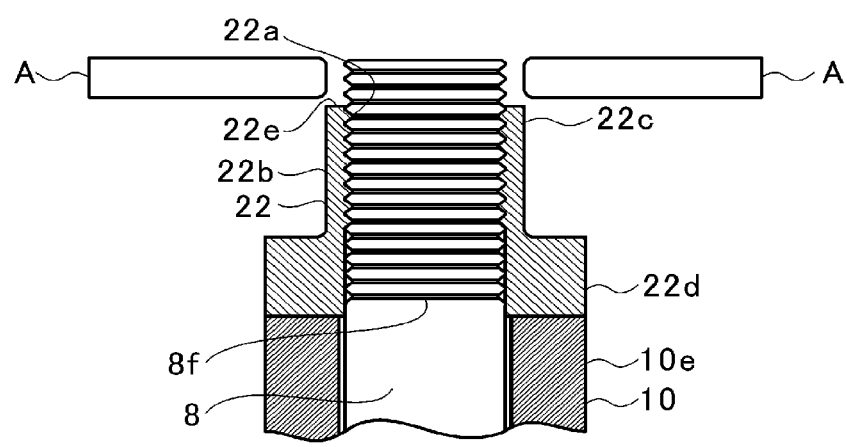

FIG. 4A, FIG. 4B, and FIG. 4C are each an explanatory view for illustrating an example of a caulking process for the fastening member 22. How the caulking process proceeds is sequentially illustrated in FIG. 4A, FIG. 4B, and FIG. 4C. The shaft 8 is made of a material such as chromium molybdenum steel, which has relatively high strength. The fastening member 22 is made of a material such as carbon steel or stainless steel, which is plastically deformed more easily than the material of the shaft 8.

Further, the fastening member 22 includes a main body 22b. The main body 22b has an annular shape. An insertion hole 22a is formed in the main body 22b. The distal end portion 8a of the shaft 8 is inserted through the insertion hole 22a. The main body 22b is brought into abutment against the boss portion 10e of the compressor impeller 10. At this time, the groove portions 8f of the shaft 8 are opposed to the inner peripheral surface of the insertion hole 22a. That is, the groove portions 8f are formed in a portion of an outer peripheral surface of the distal end portion of the shaft 8 that is to be opposed to the inner peripheral surface of the insertion hole 22a.

A flange portion 22d is formed on the boss portion 10e side of the main body 22b. The flange portion 22d projects from an outer peripheral surface 22c (outer surface) of the main body 22b in the radial direction. The flange portion 22d extends in a circumferential direction of the shaft 8.

In the caulking process, first, the distal end portion of the shaft 8 is pulled in an axial direction thereof. Specifically, the pressing unit of the tension apparatus (not shown) is brought into abutment against the flange portion 22d from the upper side in FIG. 4A, FIG. 4B, and FIG. 4C (side opposite to the compressor impeller 10, or distal end side).

Then, a chucking unit (holding unit) locks a region 8g of the groove portions 8f of the shaft 8 projecting from the insertion hole 22a. Under a state in which the pressing unit is held in abutment against the flange portion 22d and the compressor impeller 10 is retained, the chucking unit applies a load of pulling the region 8g of the shaft 8 to the upper side in FIG. 4A, FIG. 4B, and FIG. 4C (projecting side of the shaft 8 as seen from the compressor impeller 10). In this manner, the shaft 8 is pulled in the axial direction.

Further, a jig "A" is arranged to be opposed to the flange portion 22d side (compressor impeller 10 side) of the outer peripheral surface 22c of the fastening member 22 in the radial direction, and is brought into abutment against the outer peripheral surface 22c of the fastening member 22. A plurality of (for example, three) jigs "A" are arranged on the outer peripheral surface 22c of the fastening member 22 at intervals in the circumferential direction while being kept away from, for example, the pressing unit of the tension apparatus.

Then, under a state in which the shaft 8 is pulled in the axial direction by the tension apparatus, the plurality of jigs "A" apply a pressing force to the outer peripheral surface 22c of the fastening member 22, for example, from the radially outer side to a shaft center side of the shaft 8. The plurality of jigs "A" plastically deform the fastening member 22. As a result, the inner peripheral surface of the insertion hole 22a of the fastening member 22 bites into the groove portions 8f of the shaft 8. That is, a part of the fastening member 22 enters the groove portions 8f.

After that, as illustrated in FIG. 4B, the jigs "A" are moved along the axial direction of the shaft 8 in a direction of separating from the compressor impeller 10. The fastening member 22 is pressed by the jigs "A". In this manner, the main body 22b of the fastening member 22 is plastically deformed gradually along the axial direction. A range of entry of the fastening member 22 into the groove portions 8f is expanded in the axial direction. Under this state, the jigs "A" are moved to the upper side in FIG. 4A, FIG. 4B, and FIG. 4C with respect to an upper end of the main body 22b. As illustrated in FIG. 4C, the fastening member 22 enters the groove portions 8f up to the upper end of the main body 22b (side opposite to the compressor impeller 10).

In such a manner, the fastening member 22 is plastically deformed to enter the groove portions 8f. The fastening member 22 is caulked to the shaft 8. Under a state in which the shaft 8 is pulled in the axial direction, the fastening member 22 is caulked. Accordingly, the axial tension is generated between the stepped surface 8d of the shaft 8 and the fastening member 22. The oil thrower member 21 and the compressor impeller 10 are fastened to the shaft 8.

For example, when thread grooves are formed in the distal end portion 8a of the shaft 8 and a nut is fastened to the shaft 8, nut fastening torque is set within a predetermined range. Even in this case, the axial tension to be generated is influenced by fluctuation in friction between the nut and the boss portion 10e. Accordingly, it has been difficult to control the axial tension.

In this embodiment, the fastening member 22 is fastened to the shaft 8 through caulking, and hence the axial tension can be easily controlled. For example, a tension load applied by the tension apparatus can be directly measured, or the tension load can be derived from an elastic modulus by measuring extension (strain) of the shaft 8. Further, as compared to screw fastening, the fastening member 22 can be prevented from being loosened with respect to the shaft 8.

Further, the jigs "A" are moved along the axial direction of the shaft 8 in the direction of separating from the compressor impeller 10. Accordingly, as compared to a case in which the jigs "A" are moved in a direction of approaching the compressor impeller 10, there is no fear in that an increase in axial tension is brought about. The increase in axial tension due to the caulking process is avoided. The desired axial tension can be generated.

FIG. 5 is an enlarged view of the groove portions 8f of the shaft 8. As illustrated in FIG. 5, the groove portions 8f formed in the distal end portion 8a extend in parallel to the circumferential direction of the shaft 8. There is exemplified a case in which thread grooves are formed instead of the groove portions 8f, and the fastening member 22 is caulked to the thread grooves. In this case, the thread grooves are inclined with respect to the circumferential direction of the shaft 8. Accordingly, when a part of the fastening member 22 enters the thread grooves, the axial tension is divided into and applied as a component force parallel to the thread grooves and a component force perpendicular to the thread grooves. The component force parallel to the thread grooves acts as a force of rotating the fastening member 22. When a frictional force is insufficient, the fastening member 22 may be slid in a rotating direction.

Here, the groove portions 8f extend in parallel to the circumferential direction of the shaft 8. Accordingly, a force of sliding the fastening member 22 in the rotating direction does not act. As compared to a case in which the groove portions 8f are inclined with respect to the circumferential direction of the shaft 8, an effect of preventing loosening of the fastening member 22 is enhanced.

Further, in general, the thread grooves are formed in accordance with standards. Accordingly, there are limitations on shapes of the thread grooves. When, without forming the thread grooves, the groove portions 8f are formed to extend in parallel to the circumferential direction of the shaft 8, no limitations are imposed on the groove portions 8f unlike the thread grooves. The groove portions 8f can be formed into shapes suitable for the caulking process. Specifically, for example, when a bottom surface 8h of each of the groove portions 8f is formed into a curved surface having a curvature gentler (smaller) than that of the thread groove formed in accordance with standards, a region of the fastening member 22, which has entered the groove portions 8f, is also shaped to have a gentler curvature. Stress concentration due to the axial tension is prevented, thereby increasing strength. Here, description is made of the bottom surface 8h of the groove portion 8f. However, the same holds true for, for example, an apex of a thread crest of the groove portion 8f. That is, the apex of the thread crest of the groove portion 8f is formed into a curved surface having a curvature gentler (smaller) than that of the thread groove formed in accordance with standards. With this, stress concentration due to the axial tension is prevented, thereby increasing strength.

FIG. 6A is an explanatory view for illustrating a first modification example. FIG. 6B is an explanatory view for illustrating a second modification example. FIG. 6C is an explanatory view for illustrating a third modification example. As illustrated in FIG. 6A, in the first modification example, groove portions 38f are curved in an undulate shape. Further, as illustrated in FIG. 6B, in the second modification example, groove portions 48f are formed of intersecting grooves that are inclined with respect to the circumferential direction of the shaft 8 to have a net-like shape.

Through formation of the groove portions 38f and 48f, an inhibiting force of inhibiting displacement of the fastening member 22 in the rotating direction is increased. Further, as in a third modification example illustrated in FIG. 6C, groove portions 58f may be formed to be inclined with respect to the circumferential direction of the shaft 8.

FIG. 7A is an explanatory view for illustrating a fourth modification example. FIG. 7B is an explanatory view for illustrating a fifth modification example. FIG. 7A is a view for illustrating a fastening member 62 in the fourth modification example as seen from an end portion 62e side opposite to a flange portion 62d, and FIG. 7B is a view for illustrating a fastening member 72 in the fifth modification example as seen from an end portion 72e side opposite to a flange portion 72d. Here, the end portion 62e and the end portion 72e are respectively an end portion of a main body 62b and an end portion of a main body 72b on the side (distal end side of the shaft 8) opposite to the compressor impeller 10. As illustrated in FIG. 7A and FIG. 7B, the main body 62b of the fastening member 62 and the main body 72b of the fastening member 72 may each have a shape other than an annular shape.

As illustrated in FIG. 7A, in the fourth modification example, a cutout portion 62f is formed in a part of the main body 62b and the flange portion 62d of the fastening member 62 in the circumferential direction. Through formation of the cutout portion 62f in this way, the fastening member 62 is elastically deformed. An inner diameter of an insertion hole 62a is easily changed. Accordingly, the fastening member 62 of common can be used for a plurality of dies different from each other in outer diameter of the shaft 8.

As illustrated in FIG. 7B, in the fifth modification example, the main body 72b of the fastening member 72 includes a deformation portion 72h. The deformation portion 72h projects from an inner peripheral surface 72g of the main body 72b. The deformation portion 72h projects from an outer peripheral surface 72c. A plurality of (for example, three) deformation portions 72h are formed at intervals in the circumferential direction of the main body 72b. The deformation portions 72h extend from the flange portion 72d to the end portion 72e in the axial direction.

The caulking process is performed by pressing the fastening member 72 radially inward from the outer peripheral surface 72c side of the deformation portion 72h by the jig "A". That is, a portion to be pressed by the jig "A" corresponds to a part of the fastening member 72 in the circumferential direction. As described above, in the caulking process, it is not always necessary to press an entire periphery of the fastening member 72.

Figure 8A:
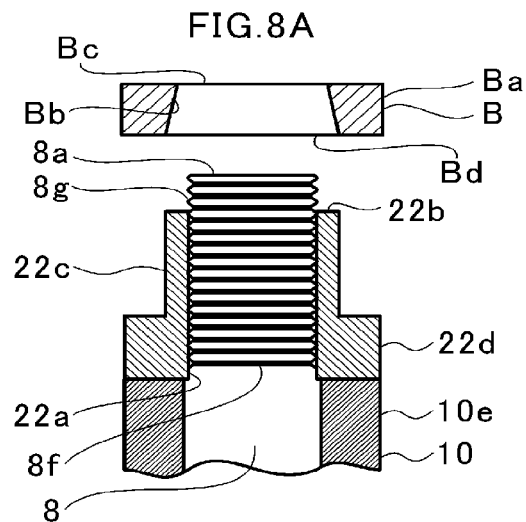
FIG. 8A, FIG. 8B, and FIG. 8C are explanatory views for illustrating a sixth modification example.
Figure 8B:
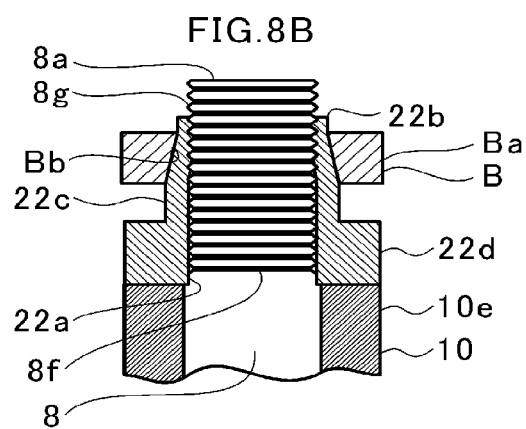
Figure 8C:
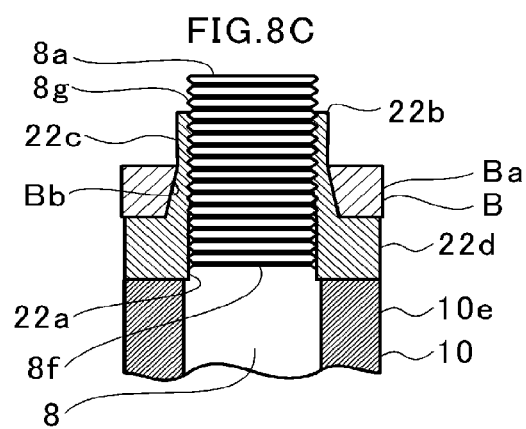

FIG. 8A, FIG. 8B, and FIG. 8C are explanatory views for illustrating a sixth modification example, and views for illustrating a caulking process in the sixth modification example corresponding to the caulking process in FIG. 4A, FIG. 4B, and FIG. 4C. In the sixth modification example, the fastening member 22 and the shaft 8 have substantially the same configurations as those of the above-mentioned embodiment. As illustrated in FIG. 8A, FIG. 8B, and FIG. 8C, in the sixth modification example, a jig "B" is used. The jig "B" includes a main body portion Ba having an annular shape. A tapered hole Bb is formed in the main body portion Ba of the jig "B". An inner diameter of the tapered hole Bb increases from one end Bc to another end Bd. Here, the inner diameter of the tapered hole Bb at the one end Bc is smaller than, for example, a distance between the shaft center of the shaft 8 and the jig "A" illustrated in FIG. 4A before pressing the main body 22b. The inner diameter of the tapered hole Bb at the one end Bc is smaller than the outer diameter of the main body 22b of the fastening member 22.

Similarly to the above-mentioned embodiment, under a state in which the shaft 8 is pulled in the axial direction by the tension apparatus, the main body 22b of the fastening member 22 and the distal end portion 8a of the shaft 8 are inserted through the tapered hole Bb of the jig "B" from the another end Bd to the one end Bc. The inner diameter of the tapered hole Bb at the one end Bc is smaller than the outer diameter of the main body 22b. Accordingly, as illustrated in FIG. 8B, the main body 22b is pressed by the inner peripheral surface of the tapered hole Bb to the shaft center side of the shaft 8, and thus is plastically deformed.

Then, as illustrated in FIG. 8C, until the jig "B" is brought into abutment against the flange portion 22d of the fastening member 22, the main body 22b of the fastening member 22 and the distal end portion 8a of the shaft 8 are inserted through the tapered hole Bb of the jig "B". In this manner, the main body 22b of the fastening member 22 is plastically deformed gradually along the axial direction. The range of entry of the fastening member 22 into the groove portions 8f is expanded in the axial direction. As a result, the fastening member 22 is caulked to the shaft 8. The oil thrower member 21 and the compressor impeller 10 are fastened to the shaft 8 by the axial tension. As described above, through movement of the jig "B" along the axial direction of the shaft 8 to the compressor impeller 10 side, the fastening member 22 may be caulked to the shaft 8.

The embodiment has been described above with reference to the attached drawings, but, needless to say, the present disclosure is not limited to the embodiment described above. It is apparent that those skilled in the art may arrive at various alternations and modifications within the scope of claims, and those examples are construed as naturally falling within the technical scope of the present disclosure.

For example, in the embodiment and the modification example described above, description is made of the case in which the main body 22b of the fastening member 22 has an annular shape. However, the shape of the main body 22b is not limited to being an annular shape. The main body 22b may be, for example, a prism shape.

Further, in the embodiment and the modification examples described above, description is made of the case in which the fastening member 22, 62, 72 includes the flange portion 22d, 62d, 72d. When the flange portion 22d, 62d, 72d is formed, interference between the pressing unit and the chucking unit is avoided. While a position of the fastening member 22, 62, 72 is kept, pulling of the shaft 8 can be reliably performed. However, the flange portion 22d, 62d, 72d is not an essentially required component. For example, instead of the flange portion 22d, 62d, 72d, the pressing unit may be brought into abutment against the end portion 22e, 62e, 72e of the main body 22b, 62b, 72b. Even in this case, the axial tension of fastening the compressor impeller 10 can be easily controlled.

Further, in the embodiment and the modification examples described above, description is made of the case in which the chucking unit of the tension apparatus locks the region 8g of the groove portions 8f of the shaft 8 projecting from the insertion hole 22a. However, for example, a hole may be formed in a distal end (upper end in FIG. 3) of the shaft 8 in the axial direction, and grooves to be locked to the chucking unit may be formed in an inner peripheral surface of the hole. In this case, without projection of the shaft 8 from the fastening member 22, 62, 72, the upper end of the shaft 8 can be positioned inside the insertion hole 22a, 62a, 72a. Accordingly, the shaft 8 can be downsized. However, as in the embodiment and the modification examples described above, in the configuration in which the chucking unit locks the region 8g of the shaft 8 projecting from the insertion hole 22a, a long region to be caulked can be secured in the axial direction. Stable fastening is possible.

Further, in the embodiment and the modification examples described above, description is made of the case in which the outer peripheral surface of the fastening member 22, 62, 72 extends in parallel to the axial direction of the shaft 8. However, the outer peripheral surface of the fastening member 22, 62, 72 may be inclined with respect to the axial direction of the shaft 8. The outer peripheral surface of the fastening member 22, 62, 72 may be formed into a curved surface.

Further, in the embodiment and the modification examples described above, description is made of the case in which, in the region of the shaft 8 in which the groove portions 8f, 38f, 48f, 58f are formed, maximum outer diameters (external contours) of a plurality of crests and grooves are constant in the axial direction of the shaft 8. However, the maximum outer diameters of the plurality of crests and grooves may become smaller on the distal end (upper end in FIG. 3) side of the shaft 8 in the axial direction. Conversely, the maximum outer diameters of the plurality of crests and grooves may become larger on the distal end side of the shaft 8 in the axial direction. Further, the outer peripheral surface of the distal end portion 8a of the shaft 8 may be curved. The maximum outer diameters of the plurality of crests and grooves may become smaller on the distal end side in the axial direction, and become larger on the further distal end side. The maximum outer diameters of the plurality of crests and grooves may become larger on the distal end side in the axial direction, and become smaller on the further distal end side.

Further, in the embodiment described above, description is made of the case in which the jigs "A" are moved along the axial direction of the shaft 8 in the direction of separating from the compressor impeller 10 (to the upper side in FIG. 4A, FIG. 4B, and FIG. 4C), to thereby perform the caulking process. However, the jigs "A" may be moved in the axial direction of the shaft 8 in a direction of approaching the compressor impeller 10 (to the lower side in FIG. 4A, FIG. 4B, and FIG. 4C), to thereby perform the caulking process.

Further, in the embodiment and the modification examples described above, description is made of the case in which the fastening member 22, 62, 72 is used to mount the compressor impeller 10 to the shaft 8. However, the fastening member 22, 62, 72 may be used to mount the turbine impeller 9 to the shaft 8. In this case, a through hole similar to that of the compressor impeller 10 is formed in the turbine impeller 9, and the shaft 8 is inserted through the through hole. The fastening member 22, 62, 72 is caulked to the distal end portion 8a of the shaft 8 projecting from the through hole of the turbine impeller 9.

INDUSTRIAL APPLICABILITY

The present disclosure is applicable to a turbocharger including an impeller mounted to a shaft, and to a method for assembling a turbocharger.

What is claimed is:

1. A method of assembling a turbocharger including an impeller having a through hole, and a shaft, the method comprising:
   inserting the shaft through the through hole; and
   caulking a fastening member to a distal end portion of the shaft projecting from the through hole.

2. The method of assembling a turbocharger according to claim 1, wherein the caulking the fastening member includes:
   inserting the distal end portion of the shaft projecting from the through hole of the impeller through an insertion hole formed in a main body of the fastening member;
   applying a load of pulling the shaft; and
   caulking the fastening member to the shaft by moving a jig, which applies a pressing force from an outer surface of the fastening member to a shaft center side of the shaft, in an axial direction of the shaft so as to press the fastening member.

3. The method of assembling a turbocharger according to claim 2, wherein, in the caulking the fastening member to the shaft by moving the jig in the axial direction of the shaft so as to press the fastening member, the jig is moved along the axial direction of the shaft in a direction of separating from the impeller.

* * * * *